United States Patent
Li et al.

(10) Patent No.: US 6,956,698 B2
(45) Date of Patent: Oct. 18, 2005

(54) OPTICAL POLARIZED LIGHT SOURCE DEVICE AND METHOD OF MAKING SAME

(75) Inventors: Peng Li, Beijing (CN); KaiLi Jiang, Beijing (CN); QunQing Li, Beijing (CN); ShouShan Fan, Beijing (CN)

(73) Assignees: Tsinghua University, Beijing (CN); Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/684,029

(22) Filed: Oct. 9, 2003

(65) Prior Publication Data

US 2004/0179258 A1 Sep. 16, 2004

(30) Foreign Application Priority Data

Mar. 11, 2003 (CN) .......................................... 3113920 A

(51) Int. Cl.⁷ ........................... G02B 27/28; G02F 1/03; B01J 23/40
(52) U.S. Cl. ........................ 359/486; 359/246; 502/326
(58) Field of Search ................................ 359/245, 246, 359/295, 296, 486, 490, 492, 500; 257/428, 401; 438/142, 149; 423/447.3, 453, 454; 502/326, 327, 335–338, 258–260

(56) References Cited

U.S. PATENT DOCUMENTS

| | | | | |
|---|---|---|---|---|
| 6,803,260 B2 | * | 10/2004 | Shin et al. | 438/142 |
| 6,806,996 B2 | * | 10/2004 | Tatsuura et al. | 359/298 |
| 2004/0119127 A1 | * | 6/2004 | Anazawa et al. | 257/428 |
| 2005/0037547 A1 | * | 2/2005 | Bertin et al. | 438/142 |

OTHER PUBLICATIONS

Nanotubes offer new light, Photonics Technology World, Aug. 2001.*
M. Jose–Yacaman et al., "Catalytic growth of carbon microtubules with fullerene structure", Appl. Phys. Lett. 62(6), 8(1993).
M. Terrones et al., "Controlled production of aligned–nanotube bundles", Nature 388, 52(1997).
Fan. S. S. et al., "Self–oriented regular arrays of carbon nanotube and their field emission properties", Science 283, 512–514(1999).
Kaili Jiang et al., "Spinning continuous carbon nanotube yarns", Nature 419, 801 (2002).

* cited by examiner

Primary Examiner—Georgia Epps
Assistant Examiner—M. Hasan
(74) Attorney, Agent, or Firm—Wei Te Chung

(57) ABSTRACT

The present invention provides fan optical polarized light source device. The polarized light source device includes at least one carbon nanotube bundle (204) and two gold electrodes (206) respectively connected to ends of the bundle. The bundle has a length of approximately 600 microns, and includes a number of carbon nanotubes bundled together and substantially parallel to each other. Each electrode includes at least one gold wire, which is bonded to an inside of an end of the bundle by an ultrasonic wire bonder. When the polarized light source device is connected to an electrical source, a polarized incandescent light beam emits from the bundle of the polarized light source device. A direction of polarization of the light beam is parallel to an axis of the bundle. The present invention further provides a method of fabricating the polarized light source device.

18 Claims, 1 Drawing Sheet

OPTICAL POLARIZED LIGHT SOURCE DEVICE AND METHOD OF MAKING SAME

BACKGROUND OF THE INVENTION

1. Field of the Invention

The present invention relates to optical devices and methods of making such devices, and more particularly to an optical polarized light source device and a method of making such device.

2. Description of Related Art

In the optical device field, polarized light is obtained by using a polarizer which absorbs or reflects light of one polarization and transmits light of the other polarization. Therefore, polarizers may be categorized as either absorbable of reflective polarizers.

Kaili Jiang et al. discloses an absorbable polarizer in an article entitled "Spinning Continuous Carbon Nanotube Yarns"(Nature Vol. 419, P.801 24 Oct. 2002). A method of making the polarizer comprises the following steps: (1) drawing a carbon nanotube yarn from a superaligned array of carbon nanotubes, each carbon nanotube yarn comprising a plurality of carbon nanotube bundles joined end to end in a kind of chain with van der Waals attractive force interconnecting ends of adjacent bundles; and (2) aligning pieces of the carbon nanotube yarn side-by-side and substantially parallel to one another on a transparent substrate such that an optical polarizing film comprising a plurality of substantially parallel carbon nanotubes is formed on the substrate. When light beams are transmitted into a front side of the polarizer, light beams having a polarization parallel to the carbon nanotubes are absorbed, whereas light beams having another polarization normal to the carbon nanotubes are transmitted through the polarizer. This results in polarized light beams transmitting from a rear side of the polarizer. Since the diameter of a carbon nanotube is approximately only 0.4~30 nm, the polarizing capability of the polarizer can extend into the UV region.

However, there is no device in the art which can directly provide polarized light beams.

SUMMARY OF THE INVENTION

Accordingly, an object of the present invention is to provide a device that can generate polarized light beams.

In order to achieve the object set out above, the present invention provides an optical polarized light source device. The polarized light source device comprises at least one carbon nanotube bundle, and two gold electrodes respectively connected to ends of the bundle. The bundle has a length of approximately 600 microns, and comprises a plurality of carbon nanotube bundled together and parallel to each other. Each electrode comprises at least one gold wire which is bonded to an inside of an end of the bundle by an ultrasonic wire bonder. When the polarized light source device is connected to an electrical source, a polarized incandescent light beam emits from the bundle of the polarized light source device. A direction of polarization of the light beam is parallel to the axis of the bundle.

The present invention also provides a method of fabricating the polarized light source device, the method comprising the following steps:

(1) depositing a catalyst on a substrate and patterning the catalyst such that one or more patterned catalyst regions are produced;

(2) exposing the catalyst to a carbon containing gas at a predetermined temperature such that one or more bundles of substantially parallel carbon nanotubes grow from the patterned catalyst regions in a direction substantially perpendicular to the substrate;

Other objects, advantages and novel features of the present invention will become more apparent from the following detailed description when taken in conjunction with the accompanying drawing, in which:

DETAILED DESCRIPTION OF PREFERRED EMBODIMENTS OF THE INVENTION

Figure 1:
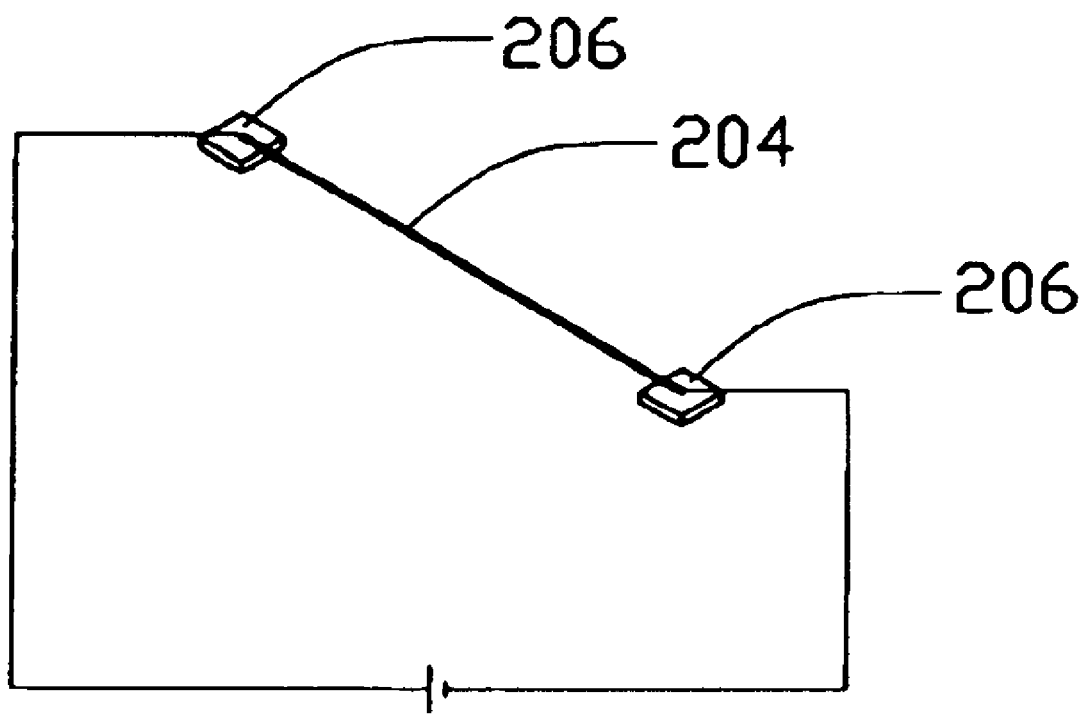
FIG. 1 is a schematic view of the polarized light source device of the present invention.

Referring to FIG. 1, an optical polarized light source device of the present invention comprises a carbon nanotube bundle 204, and two gold electrodes 206 respectively connected to ends (not labeled) of the bundle 204. The bundle 204 has a length of approximately 600 microns, and comprises a plurality of carbon nanotubes bundled together and substantially parallel to each other. Each electrode 206 comprises at least one gold wire (not shown), which is bonded to an inside of a corresponding end of the bundle 204 by an ultrasonic wire bonder. When the polarized light source device is connected to an electrical source, a polarized incandescent light beam emits from the bundle 204. A direction of polarization of the light beam is parallel to an axis of the bundle 204.

The origin of polarization of the light beam can be qualitatively explained as follows. In the case of resistance heating filaments, a light beam is mainly radiated by moving electrons, which are accelerated by applied voltage and decelerated by lattices of the filaments. For a carbon nanotube, which is a quasi-one dimensional conductor, the movement of electrons is confined to axial directions of the carbon nanotube. Based on the theory of classical electrodynamics:

$$E_\alpha = \frac{e}{c}\left[\frac{n \times (n \times \beta)}{R}\right]_{ret}$$

where $E_\alpha$ is the electric field vector of the light beam, e is the electron quantity, c is the capacitance, n is the unit vector of the direction of observation, $\beta$ is the acceleration vector which is along the axial direction of the carbon nanotube, and R is the distance between the electron and the observation point. The subscript "ret" means that the quantity in the brackets is to be evaluated at the retarded potentials. The direction of observation is perpendicular to $\beta$, therefore the above formula can be reduced to:

$$E_\alpha = -\frac{e}{c}\left(\frac{\beta}{R}\right)_{ret}$$

This equation shows that the electric field vector of the light beam is parallel to the axis of the carbon nanotube. That is, the light beam emitting from the resistance heating carbon nanotube is polarized along the axis of the carbon nanotube.

To fabricate the polarized light source device of the present invention, a method comprising two steps is provided as follows:

Step 1. Fabricating a carbon nanotube bundle 204, discussed in greater detail below.

Firstly, a substrate is provided. The substrate includes a silicon wafer, which is two inches in diameter and 350 microns thick. The substrate is patterned with a catalyst-iron film of approximately 5 nm thickness by e-beam evaporation through a shadow mask. After deposition of the iron film, the substrate is annealed in air at 300 to 500 degrees Centigrade. This annealing step oxidizes the iron film to create iron oxide nanoparticles. The substrate is then placed in a cylindrical quartz boat sealed at one end, and the quartz boat is put into the center of a 2-inch quartz tube reactor housed in a tube furnace. The furnace is heated to approximately 700 degrees Centigrade in flowing protecting gas, which is preferably argon gas. Carbon containing gas, preferably acetylene gas, is then introduced into the furnace. A plurality of carbon nanotube bundles 204 grows on patterned catalyst regions in a direction substantially perpendicular to the substrate. Lengths of the bundles 204 are approximately 600 microns, and cross-sections of the bundles 204 are approximately the same as those of corresponding patterned catalyst regions. According to transmission electron microscope observations, carbon nanotubes in each bundle 204 are well aligned, and each carbon nanotube is continuously graphitized and can be regarded as a supermolecule 600 microns long.

It will be apparent to those having ordinary skill in the field of the present invention that the acetylene gas described may be substituted with methane, ethane or another similar hydrocarbon gas. In addition, the argon gas described may be substituted with nitrogen, helium or another suitable protecting gas. Furthermore, the catalyst-iron described may be substituted with cobalt or nickel.

Step 2. Securing a carbon nanotube bundle 204 to a pair of gold electrodes 206. A bundle 204 is taken from the substrate. Gold wires are respectively pressed inside the ends of the bundle 204, and are then bonded to the electrodes 206 by an ultrasonic wire bonder.

It will be apparent to those having ordinary skill in the field of the present invention that the polarized light source device of the present invention may comprise at least two carbon nanotube bundles 204 and two gold electrodes 206 respectively connected to ends of the bundles 204. The polarized light source device of the present invention may also comprise a single carbon nanotube and two gold electrodes 206 respectively connected to ends of the carbon nanotube.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An optical polarized light source device comprising:
at least one carbon nanotube bundle; and electrodes electrically connected with the at least one carbon nanotube bundle so as to resistance heat, at least one carbon nanotube bundle for making a polarized light beam emit therefrom; and wherein a length of the at least one carbon nanotube bundle is approximately 600 microns.

2. The optical polarized light source device in accordance accordance with claim 1, wherein each of the electrodes comprises at least one gold wire connected with the at least one carbon nanotube bundle for establishing an electrical connection therebetween.

3. The optical polarized light source device in accordance with claim 1, wherein at least one carbon nanotube bundle comprises a plurality of carbon nanotubes that are substantially parallel to one another.

4. The optical polarized light source device in accordance with claim 1, wherein the electrodes are made of gold material.

5. An optical polarized light source device comprising:
a carbon nanotube; and electrodes electrically connected with the carbon nanotube so as to resistance heat the carbon nanotube for making a polarized light beam emit therefrom; and wherein a length of the at least one carbon nanotube bundle is approximately 600 microns.

6. A method of fabricating an optical polarized light source device, the method comprising the steps of:
(1) depositing a catalyst on a substrate, and patterning the catalyst such that one or more patterned catalyst regions are produced;
(2) exposing the catalyst to a carbon containing gas at a predetermined temperature such that one or more bundles of substantially parallel carbon nanotubes grow from the patterned catalyst regions in a direction substantially perpendicular to the substrate;
(3) taking at least one bundle from the substrate; and
(4) connecting the at least one bundle to electrodes.

7. The method in accordance with claim 6, wherein the catalyst is selected from the group consisting of iron, cobalt and nickel.

8. The method in accordance with claim 6, wherein step (1) comprises patterning a catalyst film of approximately 5 nm thickness on the substrate by e-beam evaporation through a shadow mask.

9. The method in accordance with claim 6, further comprising the step of annealing the substrate with the catalyst at a temperature in the range from 300 to 500 degrees Centigrade.

10. The method in accordance with claim 6, wherein the predetermined temperature of step (2) is approximately 700 degrees Centigrade.

11. The method in accordance with claim 6, further comprising the step of exposing the catalyst to flowing protecting gas before exposing the catalyst to the carbon containing gas.

12. The method in accordance with claim 6, wherein step (4) comprises the step of pressing at least one gold wire inside each end of the bundle, and then bonding the gold wires to the electrodes.

13. The method in accordance with claim 6, wherein the protecting gas is selected from the group consisting of nitrogen, helium and argon.

14. The method in accordance with claim 6, wherein the carbon containing gas is selected from the group consisting of methane. ethane, and acetylene.

15. A process of providing an optical polarized light, comprising steps of:
providing a bundle of parallel nanotubes; and
via electricity passing along said nanotubes, emitting said optical polarized light by following the equation;

$$E_\alpha = \frac{e}{c}\left[\frac{n \times (n \times \beta)}{R}\right]_{ret}$$

where $E_{60}$ is the electric field vector of the light beam, e is the electron quantity, c is capacitance, n is the unit vector of the direction of observation, $\beta$ is the acceleration vector which is along the axial direction of the carbon nanotube, and R is the distance between the electron and the observation point under a condition that the subscript "ret" means that the quantity in the brackets is to be evaluated at the retarded potentials.

16. An optical polarized light source device comprising:
at least one carbon nanotube bundle; and
electrodes connected with the carbon nanotube bundle, wherein a length of the at least one carbon nanotube bundle is approximately 600 microns.

17. The optical polarized light source device in accordance with claim 6, wherein each of the electrodes comprises at least one gold wire which is bonded to an inside of a corresponding end of the at least one carbon nanotube bundle.

18. The optical polarized light source device in accordance with claim 16, wherein the electrodes are made of gold material.

* * * * *